United States Patent
Zydek et al.

(10) Patent No.: US 6,502,019 B1
(45) Date of Patent: Dec. 31, 2002

(54) ELECTRONIC DIGITAL DEVICE EMPLOYING FAULT DETECTION

(75) Inventors: Michael Zydek, Langgöns (DE); Wolfgang Fey, Niedernhausen (DE); Adrian Traskov, Steinbach (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/582,894

(22) PCT Filed: Dec. 28, 1998

(86) PCT No.: PCT/EP98/08478

§ 371 (c)(1),
(2), (4) Date: Jan. 12, 2001

(87) PCT Pub. No.: WO99/35543

PCT Pub. Date: Jul. 15, 1999

(30) Foreign Application Priority Data

Jan. 7, 1998 (DE) .......................... 198 00 311

(51) Int. Cl.[7] .......................... G06F 7/00; G05B 11/01; H02H 3/05; B60T 8/88
(52) U.S. Cl. .............. 701/29; 700/21; 174/6; 303/122.05
(58) Field of Search .................... 701/29, 31, 34–36, 701/41, 43, 51, 53–54, 62, 70–71, 76, 93, 97, 99, 107, 114–115; 700/1–2, 26, 4–5, 20–21, 79, 81–82; 714/100, 1–2, 6, 10–13, 21, 25, 30–31, 37, 47–57, 703, 722, 718–719, 798–801, 745–747; 303/121–122, 122.01–112.06; 280/5.501–5.502

(56) References Cited

U.S. PATENT DOCUMENTS

| | | | | |
|---|---|---|---|---|
| 4,672,529 A | * | 6/1987 | Kupersmit | 700/1 |
| 4,766,834 A | * | 8/1988 | Miyayama et al. | 114/144 E |
| 5,313,625 A | * | 5/1994 | Hess et al. | 714/10 |
| 6,201,997 B1 | * | 3/2001 | Giers | 700/79 |

FOREIGN PATENT DOCUMENTS

| | | | | |
|---|---|---|---|---|
| DE | 30 24 370 | 1/1982 | | |
| DE | 37 25 750 | 2/1989 | | |
| DE | 41 34 396 | 5/1992 | | |
| DE | 41 37 124 | 5/1993 | | |
| DE | 42 12 337 | 10/1993 | | |
| DE | 43 41 082 | 6/1995 | | |
| DE | 195 04 404 | 6/1996 | | |
| DE | 195 09 150 | 9/1996 | | |
| DE | WO97/06487 | * | 2/1997 | G06F/11/18 |
| DE | 195 29 434 | 2/1997 | | |
| EP | 0 590 175 | 4/1994 | | |
| GB | 2 186 716 | 9/1987 | | |
| WO | 95 15518 | 6/1995 | | |

OTHER PUBLICATIONS

Search Report of the German Patent Office for Application No. 198 00 311.0.

* cited by examiner

*Primary Examiner*—Thu Nguyen
(74) *Attorney, Agent, or Firm*—Rader, Fishman & Grauer PLLC

(57) ABSTRACT

An electronic digital device for controlling or adjusting processes in a motor vehicle has several components, of which at least one arithmetic unit and a bus connecting the components are redundant. At least one component is not redundant. The electronic device can exhibit a preferably redundant monitoring device which compares the data arising in the redundant systems and outputs an error signal when the data deviate from one another.

13 Claims, 2 Drawing Sheets

ELECTRONIC DIGITAL DEVICE EMPLOYING FAULT DETECTION

TECHNICAL FIELD

The present invention discloses an electronic digital device and more particularly relates to electronic digital devices for controlling various vehicles brake or stability systems.

BACKGROUND OF THE INVENTION

Complex and, in particular, safety-relevant functions of vehicles are increasingly controlled or adjusted by electronic digital devices. Such control or adjusting devices, for example, can be used in connection with the engine of the vehicle, the vehicle brake system, transmission, chassis etc. It is important that these kinds of control systems operate faultlessly so that such modem requirements as environmental friendliness, noise reduction as well as safety requirements can be fulfilled.

Generally, the electronic digital devices mentioned above exhibit an arithmetic unit (CPU), a read-write memory (RAM), a read-only memory (ROM) and more recently also a flash memory (FLS) and interface modules (ITF). These components are used for the internal operations of the electronic digital device as well as for its communication with the sensor means and actuator means.

When the electronic digital device is used in connection with safety-relevant areas, for example brake systems, engine or chassis, it must be ensured that faulty operation is prevented or that it is detected and linked to fail-safe strategies.

In the past, reliable performance of the electronic device was achieved by providing a redundant electronic device. This means that all of the control or adjusting devices are duplicated. The two devices operate on the basis of the same programs and algorithms as well as input values but independently of one another. By means of additional channels and through specially provided data, in particular data based interim results, were exchanged from time to time to determine whether the redundant control or adjusting system obtained the same results. If the results were the same, it was assumed that they were correct. Otherwise an error signal was generated. Although this complete redundancy solves the problem of preventing errors to a certain degree, it has the disadvantage of being extraordinarily expensive, since the same control or adjusting system must be duplicated. Moreover, the process of comparing the data is complicated since it must be ensured that, although the systems work relatively independently of one another, only the data actually corresponding to one another are compared.

DE-A-195 29 434 discloses a microprocessor system for safety-critical control systems. In this system, both a bus and a processor are provided redundantly. The data storage process is not redundant. Although each of these subsystems have a read-write memory and a read-only memory respectively, only the actual data are saved in one system, whereas the corresponding control data, e.g. parity bits, are saved in the other subsystem. When accessing the read-only memory, which is distributed over both subsystems, specialized transmitting devices transmit to the other subsystem those parts that are missing in it. Thus a specialized transmitting device transmits the parity bit from the parity read-only memory to the subsystem to which the parity read-only memory is connected. Also, the data from the data read-only memory are transmitted to the subsystem to which the parity read-only memory is connected via a specialized transmission device. Hence, the data on the two redundant busses are supplemented by a specialized transmitting device respectively and can be used in the same way. When the data of other non-redundant components are to be transmitted from one subsystem to the other, another transmitting device has to be provided which not only transmits the data or test signals but all data prevailing on a bus. Therefore, a complicated system of comparing the data between the two partially redundant systems is required. Furthermore, it has the disadvantage that the saved data themselves are not redundant.

BRIEF SUMMARY OF THE INVENTION

The present invention discloses an electronic digital device for controlling or adjusting processes in a motor vehicle, which allows definite detection of faults and can be manufactured at less cost and in a simpler manner.

In the electronic digital device according to the present invention, hereinafter also referred to as "control language" or "adjusting system", not all components have to be redundant. The whole system can be partially redundant, with certain components, in particular an arithmetic unit and memory, being redundant and other components not being redundant. Due to a simpler design this reduces the cost and still maintains at least the same safety standard.

In a system that exhibits redundant components, a monitoring device designed as hardware may be provided. This monitoring device compares the data prevailing in the redundant components and generates an error signal if the data deviate from one another. Such a monitoring device may also be used in the partially redundant control or adjusting systems described above.

Figure 1:
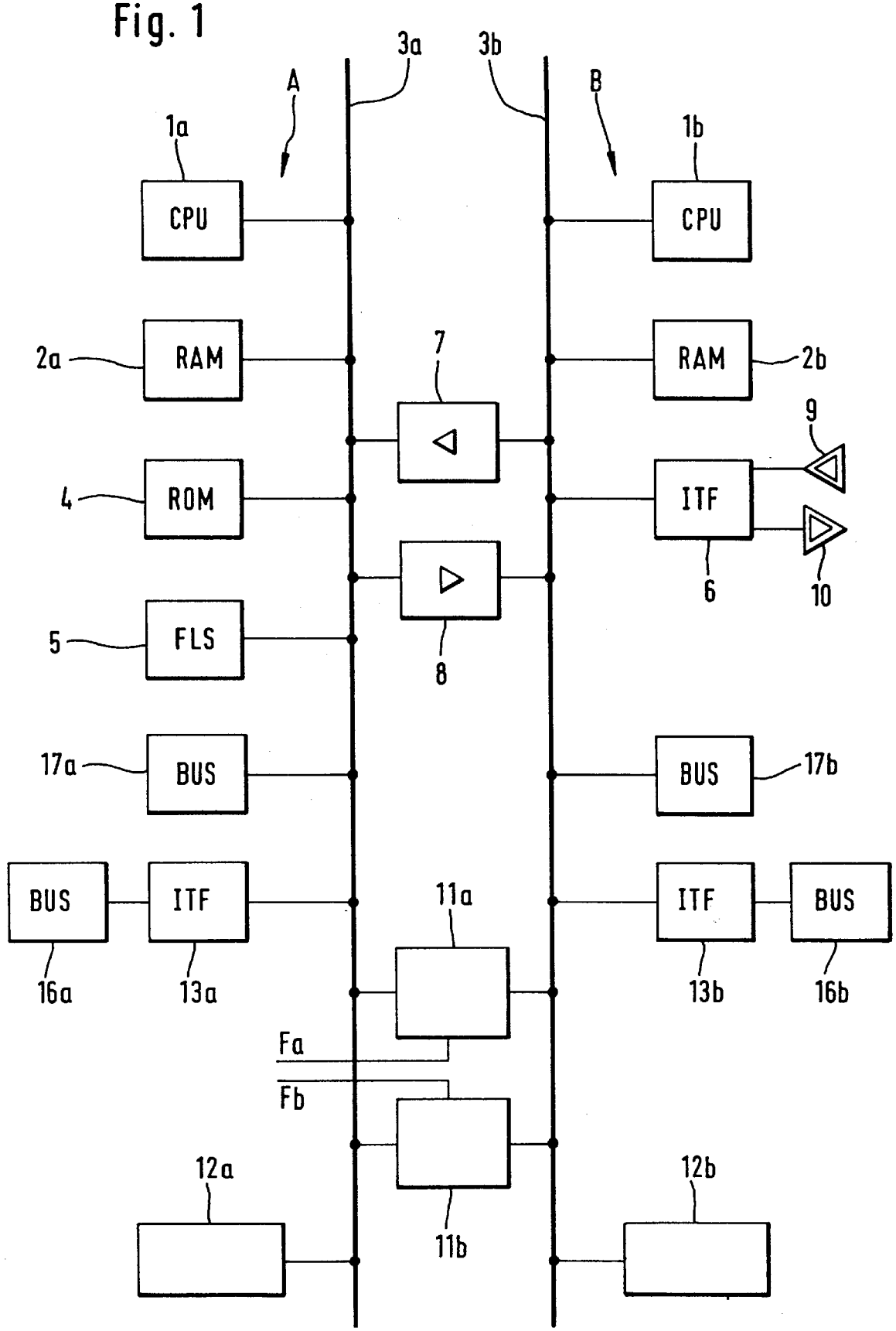
FIG. 1 is a representation of a partially redundant electronic device.

Various combinations of embodiments according to the invention are shown with reference to FIG. 1.

DETAILED DESCRIPTION OF THE PREFERRED EMBODIMENTS

In FIG. 1 the reference numbers 1a, b designate an arithmetic unit, also called CPU; reference numbers 2a, b designate a read-write memory, also called RAM; reference numbers 3a, b designate a bus; reference number 4 designates a read-only memory, also called ROM; reference number 5 designates a flash memory, also called FLS; reference numbers 7 and 8 designate transmitting devices arranged between the redundant busses 3a, b; reference numbers 11a, b designate a monitoring device and reference numbers 12a, b designate a testing device. A local peripheral bus 17a, 17b preferably can be connected to the busses 3a, 3b. In addition, a local bus 16a, 16b preferably can be connected redundantly to busses 3a, 3b via suitable interfaces 13a, 13b, with interface 13a, 13b, if necessary, being used for adjusting the speed between the two busses.

At least CPU 1 and bus 3 are redundant. CPU 1a is connected to bus 3a, and they form subsystem A, CPU 1b and bus 3b form subsystem B. In addition, RAM 2 is also shown in a redundant configuration, with RAM 2a being connected to bus 3a and RAM 2b to bus 3b. Other components need not be provided redundantly. At least one memory, for example ROM 4, is only provided once; in FIG. 1 it is connected to bus 3a. The flash memory 5 also may be non-redundant; it, too, is shown connected to bus 3a. A flash memory is a nonvolatile read-write storage. In addition, an interface module 6 may be provided, which also may be non-redundant. In FIG. 1 it is shown connected to bus 3b. Signals from sensors 9 can be received via interface module 6 and output to actuators 10.

Therefore, in order to reduce costs, individual components, for example ROM 4, may be non-redundant. Preferably the non-redundant components are connected to one of the busses.

In order to ensure that the redundant CPUs 1a, 1b also receive or can transmit those data that concern components that are not connected to "their" bus or to the bus of their subsystem, a transmitting device 7, 8 is arranged between subsystems A and B and in particular between the busses, with such transmitting device 7, 8 transmitting the data of a non-redundant component on one bus to the other bus. Thus it is ensured that the redundant components can view, process and output the same data. Transmitting device 7, 8 can be bidirectional. FIG. 1 is a schematic representation of a case where two mono-directional transmitting devices are provided.

Due to the redundancy of the read-write memory RAM 2a, 2b, the structure and operation of transmitting device 7, 8 is significantly simplified. It is no longer necessary to determine whether only a part of the bus signals is transmitted (according to the state of the art whenever RAM or ROM were accessed); instead data can be transmitted continuously from one to the other partially redundant system, irrespective of the access addresses or similar things within one of the partially redundant systems. Since the transmission of data between the partially redundant system is simplified by this, it is easier to continuously compare the results of the two partially redundant systems. When the data are compared continuously (instead of only sporadically), faulty performance is detected earlier and, hence, the safety of the system is increased.

One transmitting device 7, 8 respectively can be controlled by the target CPU. Not only data, but all signals output by the devices addressed are transmitted.

Preferably transmitting device 7, 8 is designed in such a way that a component on one bus will not even detect that it is accessing a component on another bus. This, in particular, ensures that the two systems run synchronously. If, for example, CPU 1a queries data from ROM 4, CPU 1b also will query these data from ROM 4 since it works according to the same program. It receives these data via transmitting device 8. Similarly CPU 1a, for example, can receive data from interface module 6 via transmitting device 7.

By combining a partially redundant system with a transmitting device 7,8 located between the subsystems and in particular their busses, the costs and/or work needed to secure the system is reduced. The space requirements are decreased, too. Thus it is possible to integrate the entire assembly on a single chip. This makes it easier to ensure that the two system run synchronously, since a joint clock signal can be used.

The subsystems working parallel to one another preferably run on the same programs. They can also work according to the same clock signal. In addition, they receive the same input signals and deliver–in so far as they are working faultlessly–the same output signals, too.

The electronic digital device can exhibit a monitoring device 11 which checks whether the two systems working parallel to one another actually deliver the same results. The monitoring device 11 preferably is designed as a hardware device. This means that no software or no processes have to be provided for adjusting the data between the redundant subsystems. The monitoring device 11 preferably is positioned between the redundant busses 3a, b and checks whether the data traffic on these busses is the same. Preferably the check is only carried out or only considered to be valid when the data on the busses are valid. In this way it is ensured that invalid data or transient states on the bus are not compared to one another and do not lead to erroneous error signals.

By positioning the monitoring device 11 as a hardware device between the busses, it is possible to continuously check the data on the bus. This increases the checking quality since errors can be detected as soon as they occur the first time. The design of the software for the CPUs 1a, b is simplified since no measures for carrying out data adjustments need to be provided.

The above-mentioned monitoring device 11 is particularly suitable for the above-mentioned partially redundant control or adjusting systems and/or control or adjusting systems provided on one single chip since it can be ensured in a simple manner that the subsystems run synchronously. Then the monitoring device 11 that "watches" the synchronous signals on the redundant busses 3a, b can determine the correctness of the data in a simple way, for example by comparing the data bit by bit.

The monitoring device 11 proper also can be redundant. Preferably two identical monitoring devices 11a, b can be provided in its inner structure, with such devices 11a, b carrying out the corresponding checks parallel to one another and, if necessary, delivering error signals Fa, Fb separately. These signals in turn also can be compared and processed further to another error signal when they are not identical.

Figure 2:
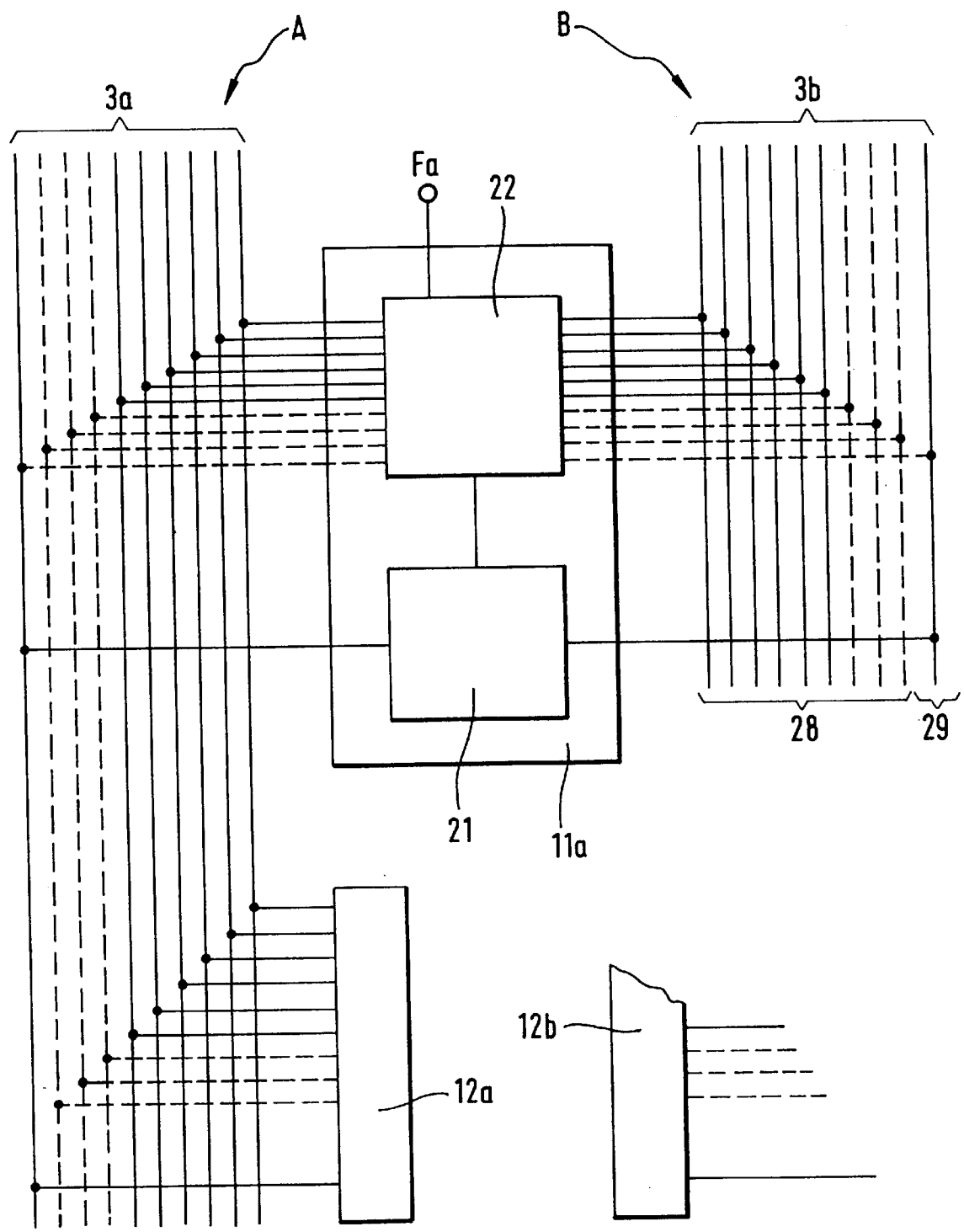
FIG. 2 is a detailed representation of the monitoring device.

FIG. 2 is an exact representation of monitoring device 11a. It is located between busses 3a and 3b. Each of these busses have data lines 28 and control lines 29 respectively; this is shown for bus 3b, the same is true for bus 3a. Monitoring device 11a also exhibits a comparator 22 that receives the individual data lines and, if applicable, also control lines from busses 3a, 3b and, for example, subjects them to a bit-by-bit comparison. Bits corresponding to one another are compared, e.g. in an EXOR gate, and only if all signals corresponding to one another of busses 3a and 3b are identical, will no error signal Fa be generated. If the value on one signal line of one bus deviates from a value on a corresponding signal line of the other bus, an error signal Fa will be output.

In order to ensure that only data that are "valid" and not accidentally prevailing on the bus are compared to one another, an evaluation device 21 may be provided. Put in general terms, evaluation device 21 can be designed in such a way that it decodes the transmission protocol of one bus, allowing the signals on busses 3a and 3b to be compared on the basis of this decoding; in particular it can be connected to control lines 29 of one bus or both busses. Based on the signals prevailing on control lines 29, evaluation device 21 determines the time when the data prevailing on the bus are valid. Only then will the comparison be executed or the result of the comparison be permitted as valid. Prior to that the output of a fault message will be prevented.

When two monitoring devices 11a, b are provided in a preferred embodiment, they can have identical inner structures. If they are designed as shown in FIG. 2, the respective evaluation devices 21 can be connected in such a way that evaluation device 21 of one monitoring device 11a "watches" control lines 29 of one bus 3a or is connected to it so as to determine the validity of the data on this bus 3a and evaluation device 21 of the other monitoring device 11b is connected to control lines 29 of the other bus 3b. In this way the signals on control lines 29 of busses 3a and/or 3b can be compared immediately. Then these signals do not necessarily have to be fed to comparator 22, and consequently this device can have a less complicated design.

Preferably all data lines 28 of busses 3a and 3b are compared to one another. However, it may also be that only a part of the lines and in particular the data lines 28 of busses 3a, 3b are fed to comparator 22. If the monitoring device 11a, 11b is provided twice (as shown in FIG. 1), one monitoring device 11a can compare the first part of the data lines with one another and the other monitoring device 11b can compare the other part. This also decreases costs, since the comparators 22 can be smaller.

FIG. 2 is a schematic representation of the testing device 12a, 12b mentioned above briefly. It is a device for calling up the situation where both busses 3a and 3b show different signals. This corresponds to an error signal. In other words, testing device 12a, 12b simulates a fault. The performance of monitoring device 11a, b is tested with testing device 12a, 12b. When testing device 12a, b simulates a fault, monitoring device 11a, b must display a fault. If it doesn't do so, it is defective and a fault is output, too.

Testing device 12a, b can be made up of two registers, each of which is connected to one bus respectively. The registers are designed in such a way that they respond to different write addresses but to identical read addresses. Thus the registers which are "unsymmetrical" with respect to their addresses can be described "unsymmetrically" in the two subsystems A and B, (i.e. with different data, by means of a "symmetrical" (=identical) program). The test task would then have a first write step that describes the register 12a of subsystem A (the write step is executed symmetrically in subsystem B, but leads to nothing here because the corresponding write address does not exist). In a second write step the (other) write address of register 12b in subsystem B is addressed; then other data than those of previous write step are written into register 12b (the symmetrical write step in subsystem A leads to nothing because the changed write address does not exist in subsystem A). Consequently, the registers contain different data after completion of the two write steps. In a subsequent read step, where both registers have the same read address, the data in the registers are read. Since these registers have different contents, different data occur on busses 3a and 3b, so that monitoring device 11a, b has to display a fault. If it doesn't do so, monitoring device 11a, b is defective and an error signal is output again, for example via CPU 1a, b.

The different write address and identical read addresses of registers 12a and 12b preferably are implemented through hardware.

A control or adjusting system with a simple designed is described by means of an electronic device designed in the manner described above. Due to the continuous monitoring of the signals on the bus, faults are detected immediately.

What is claimed is:

1. An electronic digital device for controlling vehicle processes, comprising:
    at least one redundant and non redundant components,
    an arithmetic unit,
    a bus connecting the at least one redundant and non redundant components,
    one redundant memory, wherein said bus includes at least two busses that are redundant and at least one bus that is not redundant and wherein the at least one non-redundant component is connected to one of the redundant busses,
    a transmission device is provided, which transfers the data exchange of the non-redundant component from one redundant bus to another redundant bus,
    a redundant monitoring device that compares the data arising in the redundant components and emits an error signal when the data deviate from one another, wherein the monitoring device includes a comparator implemented by means of hardware, which is connected to data lines of the redundant busses and compares the data on the busses with one another, and wherein the comparator compares the data on the redundant busses with one another whenever the data on the busses are valid.

2. An electronic digital device according to claim 1, wherein said redundant memory is a read-write memory.

3. An electronic digital device according to claim 1, wherein said at least one non-redundant component includes a read-only memory, a flash memory, or an interface module.

4. An electronic digital device according to claim 1, wherein the transmission device transmits only data signals, but not control signals.

5. An electronic digital device according to claim 1, wherein the monitoring device further includes an evaluation device connected to control lines of the redundant busses in order to determine the validity of the data on the redundant busses.

6. An electronic digital device according to claim 1, further including a testing device for testing the performance of the monitoring device.

7. An electronic digital device according to claim 6, wherein the testing device includes two registers, each of which is connected to one of the redundant busses.

8. An electronic digital device according to claim 7, wherein the two registers have different write addresses and the same read addresses.

9. An electronic digital device according to claim 1, wherein said electronic digital device is implemented on one single chip.

10. An electronic digital device according to claim 1, wherein said arithmetic unit includes first and second redundant arithmetic units.

11. An electronic digital device according to claim 10, wherein the redundant arithmetic units execute identical programs.

12. An electronic digital device according to claim 1, wherein said electronic digital device controls the brake system or the chassis of the vehicle.

13. An electronic digital device for controlling vehicle processes, comprising:

at least one redundant component and one non-redundant component, an arithmetic unit, a bus connecting the at least one redundant component and one non-redundant component, one redundant memory, wherein said bus includes at least two busses that are redundant and at least one bus that is not redundant and wherein the at least one non-redundant component is connected to one of the redundant busses, a transmission device for transferring a data exchange of the non-redundant component from one redundant bus to the other redundant bus, a redundant monitoring device for comparing the data arising in the components that comprise the at least one redundant component and emitting an error signal when the data generated by one of the components of the at least one redundant components deviates from data generated by another one of the components of the at least one redundant components, a testing device for testing the performance of the monitoring device.

* * * * *